Patented Nov. 12, 1940

2,221,511

UNITED STATES PATENT OFFICE 2,221,511

RESINOUS COMPOSITION AND METHOD OF MAKING THE SAME

Edmond F. Fiedler, Adams, and Alan F. Shepardson, Pittsfield, Mass., assignors to General Electric Company, a corporation of New York No Drawing. Application June 8, 1938, Serial No. 212,500

11 Claims. (Cl. 260—51)

The present invention relates broadly to resinous compositions and to methods of making the same. It is directed more particularly to the preparation of potentially hardening synthetic resins adapted for the manufacture of molding compositions and molded articles, in the production of which resins there is utilized a reactive oily body obtained from the destructive distillation of wood, preferably hard wood. More specifically it may be stated that the preferred reactive oily body is a purified fraction produced by distilling, preferably steam distilling, vacuum distilling, or steam and vacuum distilling one or more times, a condensate from the destructive distillation of hard wood. This fraction boils within the range of 150° to 300° C. and contains from 40 to 100 per cent reactive phenolic bodies. Best results have been obtained by the use of a fraction boiling within the range of 180° to 250° C. and containing at least 80 per cent reactive phenolic bodies. In the following description of the invention and in the appended claims, the term "wood oil" is used to designate, generally, the specific and preferred reactive oily body above described.

It has been suggested heretofore that resinous materials adapted for the production of plastic molding compositions can be produced by condensing an active methylene-containing body, in the presence of an alkaline catalyst such as ammonia, with a hard wood tar or with a distillation product of such tar. However, articles made by molding under heat and pressure molding compositions containing such alkaline-catalyzed resinous condensation products ordinarily cannot be extracted from the mold without being materially cooled. Such cooling operation considerably lengthens the molding cycle, with the result that production costs are so increased as to make uneconomical the use of such resins in molding compositions, despite the savings attained by using a somewhat lower priced raw material in the preparation of the resin. Further, molding compositions made with such resins do not, in general, convert under heat and pressure to the infusible, insoluble state as rapidly as is desirable from a production standpoint. In some cases, too, the flow or plasticity characteristics are unsatisfactory, the hot mass not readily or completely assuming the shape of the mold. This is particularly true with molded articles of intricate design. The molded articles also are deficient in certain physical characteristics, especially with respect to impact and flexural strength, and lack the appearance (surface finish) necessary to meet consumer requirements.

We have discovered that when wood oil is incorporated with another, preferably more reactive phenolic body, and the mixture is reacted with an active methylene-containing body in the presence of an acid catalyst, a resinous co-condensation product is formed which has surprisingly better properties than a similarly prepared wood oil-formaldehyde resinous condensation product.

As a consequence of our invention resinous materials comprising the above co-condensation product that have good cure rates may be prepared. The materials lend themselves readily to molding, and in hot molded state can be extracted readily from the mold without cooling the mold and the article therein. The molded articles are strong, of good appearance, and can be made rapidly and economically with standard molding equipment now in common use in the art. In general, they are comparable with similar products made from molding compositions comprising conventional potentially hardening phenol-formaldehyde resins, but are considerably less costly to make.

Briefly described, our invention is carried into effect by suitably reacting, preferably at boiling temperature under reflux, a mixture of wood oil and one or more phenolic bodies of a different kind or type with an active methylene-containing body in the presence of an acid catalyst or condensing agent, preferably sulfuric acid. As the active methylene-containing body we prefer to use formaldehyde or a compound engendering formaldehyde. The resinous condensation product is dehydrated, advantageously under vacuum, and the acidity due to the added catalyst is substantially completely neutralized, preferably with calcium hydroxide, at a suitable stage in the dehydration process. Molding compositions are produced from the resulting neutralized, dehydrated, permanently fusible resin by incorporating therewith addition materials as, for instance, suitable proportions of fillers such as wood flour, asbestine, clay, cloth cuttings, etc.; also, reagents capable of converting, or of accelerating the conversion of the permanently fusible (novolak) resin to a heat-hardenable B-stage resin (resitol). Examples of such conversion or hardening reagents are hexamethylene tetramine, calcium hydroxide, barium hydroxide and other inorganic alkaline substances, and mixtures of such alkaline substances with hexamethylene tetramine. Other addition agents may be incorporated in the molding composition may include coloring materials such as dyes or pigments; mold lubricants; plasticizers; or combinations of such materials.

In order that those skilled in the art better may understand how the present invention may be carried into effect, the following specific examples are given to illustrate the invention:

*Example 1*

| | Parts by weight |
|---|---|
| Wood oil | 180 |
| 82% phenol, remainder mainly cresol | 120 |
| Aqueous solution of formaldehyde (37½%) | 200 |
| Sulfuric acid (66° Bé.) | 7 |
| Calcium hydroxide (in 15 parts water) | 5.9 |

The above ingredients are stirred and reacted together at boiling temperature (94° to 100° C.), under reflux, for approximately two hours. Thereafter the mass is vacuum-dehydrated until about 80 to 90 per cent of the total water initially present therein has been removed. The total water is calculated by taking into consideration the water present in the aqueous formaldehyde and in the sulfuric acid, and the water formed during the reaction. Immediately after the stated per cent of water has been removed, the hydrated lime dispersed in water is added. Dehydration is now continued until substantially all the water has been removed from the resin, that is until the resin is practically free from water. In completing the hydration the temperature of the resinous mass is not allowed to exceed substantially 150° C., and preferably, 110° C.

During the dehydration process a reduced pressure of, for example, from about 4 to 23 inches of mercury (a vacuum of about 7 to 26 inches of mercury) may be employed, as desired or as may be required. Vacuum is applied slowly at first to avoid excessive entrainment of resin with the water vapor, after which it is brought to such point as will give maximum speed of dehydration consistent with efficient and economical operation. Preferably dehydration is effected under conditions whereby the resin is maintained at a temperature above about 75° C. Hence if, during dehydration, the temperature drops, for example to about 65° to 70° C., steam is turned into the jacket of the kettle to maintain the preferred temperature and to keep the mass boiling.

A method of making a permanently fusible acid-catalyzed phenol-aldehyde resin, which includes the step of neutralizing the resinous mass at a particular point in the process of vacuum-dehydrating the mass, specifically after the removal of 79 to 87 per cent of the total water initially present has been removed, is disclosed and claimed in the copending application of one of us (Edmond F. Fiedler), application Serial No. 150,376, filed June 25, 1937, now Patent No. 2,180,981, issued November 21, 1939. We have now found that when one of the reactants is wood oil, the process is more flexible and that permanently fusible resins can be obtained if the acidity due to the catalyst used in the process is neutralized after from 20 to 90 per cent of the total water initially present has been removed.

A resin prepared from the ingredients and following the procedure above described is of the permanently fusible type. It has such fluidity when hot that it may be withdrawn from the reaction vessel without difficulty. The solid resin has a flow point within the range of 65° to 105° C. Preferably, formulation is such, and processing operations are so conducted, as to obtain a resin having a flow point within the range of 85° to 100° C.

A molding composition is made from the finely ground resin in accordance with a formula such, for instance, as the following:

| | Parts by weight |
|---|---|
| Resin | 100 |
| Hexamethylene tetramine | 8 |
| Calcium hydroxide | 2 |
| Calcium stearate | 1 |
| Wood flour | 110 |

The ingredients are thoroughly mixed by milling on steam-heated rolls, or in a Banbury mixer, or by any other suitable masticating machine in accordance with conventional practice.

A molded article made from the above molding composition showed a Charpy impact strength on a ½" x ½" x 5" bar of 0.71 foot pound, a flexural strength of 10,000 pounds per square inch, a shrinkage (from the cold mold dimensions) of 8.0 mils per inch, and a dielectric strength in oil at 100° C. of 73 volts per mil. It could be extracted hot from the mold without any intermediate cooling step.

*Example 2*

| | Parts by weight |
|---|---|
| Wood oil | 75 |
| 82% phenol, remainder mainly cresol | 225 |
| Aqueous solution of formaldehyde (37½%) | 240 |
| Sulfuric acid (66° Bé.), in 25 parts water | 4 |
| Calcium hydroxide in 30 parts water | 4.4 |

Essentially the same procedure is followed in making the resin as described under Example 1, with the exception that the reaction time is approximately 5 hours.

A molding composition is made from the finely ground resin in accordance with a formula such, for example, as the following:

| | Parts by weight |
|---|---|
| Resin | 100 |
| Hexamethylene tetramine | 8 |
| Calcium hydroxide | 1.5 |
| Calcium stearate | 1 |
| Talc | 2 |
| Dye (nigrosine) | 2 |
| Wood flour | 110 |

The ingredients are thoroughly mixed. A molded article made from the resulting molding composition could be extracted hot from a mold without cooling. The molded product showed a Charpy impact strength on a ½" x ½" x 5" bar of 1.1 foot pounds, a flexural strength of 10,000 pounds per square inch, a shrinkage of 7.4 mils per inch, a dielectric strength in oil at 100° C. of 76 volts per mil, and a water absorption (A. S. T. M., 48-hour test) of 0.8 per cent.

*Example 3*

| | Parts by weight |
|---|---|
| Wood oil | 150 |
| 82% phenol, remainder mainly cresol | 75 |
| "No. 8 cresol" | 75 |
| Aqueous solution of formaldehyde (37½%) | 200 |
| Sulfuric acid (66° Bé.) | 6 |
| Calcium hydroxide (in 20 parts water) | 5.2 |

"No. 8 cresol" is a phenolic body having an initial boiling point of at least 195° C., less than 5% distilling below 200° C., 80% distilling below 206° C., and a dry- or end-point not exceeding substantially 210° C. It contains a small amount of ortho-cresol and, usually, approximately 43 to 46% meta-cresol, the remainder mainly para-cresol and xylenols.

Essentially the same procedure is followed in making the resin as described under Example 1, with the exception that the calcium hydroxide is added after about 50 per cent of the total water initially present has been removed.

A molding composition is made from the finely ground resin in accordance with a formula such, for example, as given under Example 1. The thoroughly mixed ingredients are molded under heat and pressure, yielding a molded product showing, for example, a Charpy impact strength of 0.69 foot pound, a flexural strength of 9400 pounds per square inch, and a dielectric strength in oil at 100° C. of 189 volts per mil. The molded article can be removed hot from the mold without cooling.

Example 4

| | Parts by weight |
|---|---|
| Wood oil | 150 |
| 82% phenol, remainder mainly cresol | 75 |
| Meta-para cresol | 75 |
| Sulfuric acid (66° Bé.) | 6 |
| Calcium hydroxide (in 20 parts water) | 5.2 |

The above meta-para cresol contains about 55 per cent meta-cresol, the remainder mainly para-cresol.

Essentially the same procedure is followed in making the resin as described under Example 1, with the exception that the calcium hydroxide is added after only about 20 per cent of the total water initially present has been removed.

A molding composition is made from the finely ground resin in accordance with a formula such, for instance, as given under Example 1. A molded article made from the resulting composition showed, for instance, a Charpy impact strength of 0.71 foot pound, a flexural strength of 8300 pounds per square inch, and a dielectric strength in oil at 100° C. of 120 volts per mil.

It is apparent that the examples given above are merely illustrative as to proportions, acid catalysts, phenolic bodies other than wood oil, neutralizing agents, reaction periods, dehydrating technique, etc., which are employed in making resinous and molding compositions in accordance with the present invention. In general, it may be said that the mole ratio of the phenolic body to the aldehyde will be not less than 1 to 1, and preferably is within the range of 1.05 to 1.4 moles phenolic body to 1 mole aldehyde. This is based on an assumed molecular weight of 135 for the wood oil phenolic bodies. In place of formaldehyde other aldehydes may be employed as, for example, acetaldehyde, furfural, etc. Other mineral or organic acids may be used as the catalyst in lieu of sulfuric acid, for example, hydrochloric acid, phosphoric acid, oxalic acid, etc. Likewise, alkaline substances other than hydrated lime may be employed as neutralizing agents, for instance sodium carbonate or sodium hydroxide, preferably in solution state. Hydrated lime dispersed in water is, however, the preferred neutralizing agent.

Although it is preferred to dehydrate the resinous condensation product under reduced pressure, the resinous mass also may be dehydrated, if desired, under atmospheric pressure at a maximum temperature of about 160° to 170° C. In making the molding composition the filler may be omitted entirely, if desired, but it is generally used in amounts varying, for instance, within the range of 50 to 500 parts filler to 100 parts resin, depending upon the absorbing properties of the particular filler employed and the properties wanted in the molded product.

The advantages of using a mixture of wood oil and at least one different, preferably more reactive phenolic body, are shown more clearly from a consideration of the properties of a molding composition in which the resin ingredient is one made solely with wood oil as the phenolic component, specifically a resin produced in accordance with the following formula:

| | Parts by weight |
|---|---|
| Wood oil | 400 |
| Aqueous solution of formaldehyde (37½%) | 260 |
| Sulfuric acid (66° Bé) | 11 |
| Calcium hydroxide in 30 parts water | 9.1 |

Essentially the same procedure was followed in making the resin as described under Example 1. A molding composition was made from the resulting resin in accordance with the following formula:

| | Parts by weight |
|---|---|
| Resin | 100 |
| Hexamethylene tetramine | 10 |
| Calcium hydroxide | 10 |
| Calcium stearate | 1 |
| Wood flour | 120 |

These ingredients were milled together as in the above examples. A molded article made from a representative sample of such molding composition had a dielectric strength in oil at 100° C. of 268 volts per mil. It had a flexural or transverse strength of only 3600 pounds per square inch and a Charpy impact strength (½" x ½" x 5" bar) of only 0.22 foot pound, as compared with flexural strengths of 8300 to 10,000 pounds per square inch and impact strengths of 0.69 to 1.1 foot pounds for molded articles made from resins produced as described under Examples 1 to 4.

A molding composition containing a resin produced by condensing formaldehyde with a mixture of phenolic bodies including wood oil will convert, under heat and pressure, to the infusible, insoluble state (C-stage) at least twice as fast as when wood oil alone is employed in making the resin. More particularly it may be stated that a molding composition made from the resin of, for instance, Example 1, will convert to the infusible insoluble state in from 30 to 75 seconds at a temperature of approximately 165° C. and under a pressure of about 2000 pounds per square inch, when pressed in the form of discs 4 inches in diameter and ⅛ inch thick. In contrast therewith a molding composition in which the resin component consists solely of a wood oil-formaldehyde condensation product requires heating under pressure, under similar conditions, for 2½ minutes or more before it will convert to the hard, infusible form.

By using a mixture of wood oil and a different phenolic body, more particularly a mixture of phenolic bodies consisting of wood oil and at least one other phenolic body more reactive than wood oil, and conjointly condensing the said mixture with an aldehyde, the phenol-aldehyde component accelerates, far above expectations, the curing of the wood oil-aldehyde component to the infusible state. Further, molded articles having surprisingly better physical characteristics are produced from molding compositions containing the co-condensed resin as compared with molding compositions in which the resin ingredient is solely an acid-catalyzed wood oil-aldehyde resinous condensation product or a mere mechanical mixture of separately condensed wood oil-aldehyde and phenol-aldehyde resins. For example, a molding composition made from a mechanical mixture of, by weight, 60 parts 100% wood oil-formaldehyde resin and 40 parts of a regular phenol-formaldehyde resin was slow curing. It required 3 minutes for a standard disc, 4 inches in diameter by ⅛ inch thick, to convert to the infusible insoluble state. It also had a very poor finish and a Charpy impact strength of only 0.39 foot pound. Its flexural strength was 6,400 pounds per square inch. A similarly made molding composition, but wherein the resin ingredient was made as described under Example 1 (60 parts wood oil and 40 parts 82% phenol co-condensed with formaldehyde in the presence of sulfuric acid as catalyst), had a good finish and superior properties. More particularly, it had a Charpy impact strength of 0.71 foot pound, a flexural strength of 10,000 pounds per square inch and a cure rate, under similar conditions, of less than 1 minute.

By using a molding composition containing a resin formed from a mixture of wood oil and other phenolic bodies, wood-flour-filled molded articles can be produced having the following characteristics:

| | |
|---|---|
| Charpy impact strength (½"x ½"x 5" bar) | 0.50 to 1.2 foot pounds |
| Flexural strength | 6,000 to 12,000 pounds per square inch |
| Shrinkage | 6 to 12 volts per mil |
| Dielectric strength in oil at 100° C | 50 to 200 volts per mil or more |
| Water absorption (A. S. T. M. method, 48-hour test) | 0.50 to 3.0 per cent |

Generally speaking, the above properties are approximately the same as those shown by a molded article made from a similar molding composition containing as the resin ingredient a conventional phenol-aldehyde condensation product; that is one in which wood oil is not used in its preparation.

What we claim as new and desire to secure by Letters Patent of the United States is:

1. A potentially reactive resinous composition comprising the resinous condensation product of an active methylene-containing body with a mixture of phenolic bodies consisting of wood oil and at least one other phenolic body more reactive than wood oil, in the presence of an acid catalyst.

2. A potentially reactive resinous composition comprising the neutralized, dehydrated condensation product of a mixture of phenolic bodies consisting of wood oil and at least one other phenolic body more reactive than wood oil with an aqueous solution of formaldehyde in the presence of an acid catalyst.

3. A heat-hardenable molding composition comprising a filler, a potentially reactive resinous composition which is the product of condensing, in the presence of an acid catalyst, an aldehyde with a mixture of phenolic bodies consisting of wood oil and at least one other phenolic body more reactive than wood oil, and, in addition, a reagent capable of converting the said resinous composition to a heat-hardenable state.

4. A molded article of manufacture which is the product of molding under heat and pressure the molding composition of claim 3.

5. The method of making a permanently fusible resin which comprises reacting a mixture of phenolic bodies consisting of wood oil and at least one other phenolic body more reactive than wood oil with an active methylene-containing body in the presence of an acid catalyst and heating the resulting condensation product until a resinous composition having a flow point within the range of 65° to 105° C. is obtained.

6. The method of making a permanently fusible resin which comprises reacting a mixture of phenolic bodies consisting of wood oil and at least one other phenolic body more reactive than wood oil with an equous solution of an aldehyde in the presence of an acid catalyst, dehydrating the reaction product under reduced pressure until from 20 to 90 per cent of the total water present therein has been removed, adding to the partly dehydrated product when the said amount of water has been removed an alkaline substance in an amount at least sufficient to neutralize the acidity of the added catalyst, and dehydrating the resulting product under reduced pressure until substantially all the remaining water has been removed.

7. The method of making a heat-hardenable resinous composition which comprises reacting a mixture of phenolic bodies consisting of wood oil and at least one other phenolic body more reactive than wood oil with an aqueous solution of formaldehyde in the presence of an acid catalyst, dehydrating the reaction product under reduced pressure until from 20 to 90 per cent of the total water present therein has been removed, adding to the partly dehydrated product when the said amount of water has been removed an aqueous dispersion of calcium hydroxide in an amount at least sufficient to neutralize the acidity of the added catalyst, dehydrating the resulting product under reduced pressure until substantially all the remaining water has been removed, and incorporating into the permanently fusible resin thereby obtained a reagent capable of converting the said resin to a heat-hardenable state.

8. A heat-hardenable resinous composition which is the product of the method of claim 7.

9. A molding composition comprising a filler and a heat-hardenable resinous composition which is the product of the method of claim 7.

10. A molded article of manufacture consisting of the product of molding under heat and pressure a molding composition comprising a filler and a heat hardenable resinous composition which is the product of the method of claim 7.

11. A potentially reactive resinous composition comprising the neutralized, dehydrated condensation product of a mixture of phenolic bodies with an aqueous solution of formaldehyde in the presence of an acid catalyst, said mixture consisting, by weight, of from 25 to 60 per cent wood oil and the remainder a phenolic body more reactive than wood oil, said wood oil being a condensate from the destructive distillation of hard wood distilling within the range of 180° to 250° C. and containing at least 80 per cent reactive phenolic bodies.

EDMOND F. FIEDLER.
ALAN F. SHEPARDSON.

CERTIFICATE OF CORRECTION.

Patent No. 2,221,511. November 12, 1940.

EDMOND F. FIEDLER, ET AL.

It is hereby certified that error appears in the printed specification of the above numbered patent requiring correction as follows: Page 2, first column, line 31, for "hydration" read --dehydration--; page 4, second column, line 18, claim 6, for "equous" read --aqueous--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.